United States Patent

[11] 3,621,470

[72] Inventor Steven J. Davis
Ridgefield, Conn.
[21] Appl. No. 43,669
[22] Filed June 5, 1970
[45] Patented Nov. 16, 1971
[73] Assignee General Datacom Industries
Norwalk, Conn.

[54] LOW HARMONIC DISTORTION FSK OSCILLATOR
6 Claims, 2 Drawing Figs.

[52] U.S. Cl. .......... 332/14, 307/228, 307/261, 328/36, 328/181, 328/187, 331/61
[51] Int. Cl. .......... H03k 5/08
[50] Field of Search .......... 328/187, 34, 35, 36, 181; 307/261, 228; 332/14; 331/61

*Primary Examiner*—John Kominski
*Attorney*—Pennie, Edmonds, Morton, Taylor and Adams

ABSTRACT: An FSK oscillator which generates extremely low second and third harmonics without the use of either passive or active filters if provided. The triangular-wave output from a frequency shift modulated triangular-wave generator is combined with a fully limited portion of the same wave to produce a stable output signal having a waveform which closely approximates that of a sinusoid.

INVENTOR
Steven J. Davis
BY
Pennie, Edmonds, Morton, Taylor & Adams
ATTORNEYS

INVENTOR
Steven J. Davis
BY
Pennie, Edmonds, Morton, Taylor & Adams
ATTORNEYS

LOW HARMONIC DISTORTION FSK OSCILLATOR

1. Field of the Invention

The present invention invention relates to a low frequency oscillator which generates a fundamental frequency signal having low harmonic content that can be frequency-shift modulated without affecting oscillator frequency stability. The oscillator is particularly useful in modems designed to transmit digital data over telephone lines.

2. Description of the Prior Art

Low frequency sinusoidal oscillators which can be frequency-shift modulated are not only costly to build but have also been found to have both amplitude and frequency stability limitations.

SUMMARY OF THE INVENTION

In accordance with the present invention, an FSK oscillator is provided which has excellent frequency and amplitude stability as well as low harmonic output. The triangular wave output from a frequency-shift modulated triangular-wave generator is combined with a fully limited portion of the same wave to produce a stable output signal having a waveform which closely approximates that of a sinusoid.

BRIEF DESCRIPTION OF THE DRAWINGS

Referring to FIG. 1, there is shown a triangle wave oscillator 10 frequency-shift keyed by input data on line 11. The triangular wave output is supplied to both the input of limiter 13 and one input of summer 14 as shown. The limited rectangular-wave output signal from 13 is supplied to the other input of 14 through resistance divider 15 and 16 which is proportioned to provide a rectangular wave 20 having an amplitude of about ±0.212 relative to the ±1 amplitude of triangular wave 12. Waves 12 and 20 are added in 14 to produce the desired composite signal 30 to output lead 31. Output signal 30 having the waveform shown is particularly useful because the second and third harmonic content is very low and the need for output filtering is eliminated.

Referring to FIG. 2, there is shown a preferred embodiment of a stable voltage controlled oscillator 10 for generating a triangular waveform whose frequency shift is linearly dependent on the input data signal supplied to line 11. The FSK oscillator comprises a balanced modulator 20, integrator 21 and comparator 22, each of which includes a high gain operational amplifier (gain greater than 20,000) 30, 31 and 32 as shown. Integrator 21 and comparator 22 function cooperatively to generate a stable symmetrical triangular waveform that is frequency shift modulated by balanced modulator 20. Comparator 22 has supplied to the positive input of amplifier 32 through resistor 40 the triangular wave output signal from integrator 21 having an amplitude $\pm V_Z$ established by zener diodes 41 and 42. Zener diodes 41 and 42 are connected back to back to the junction of feedback resistors 45 and 46 as shown and function to provide a temperature and voltage stable rectangular wave signal through charging resistor $R_p$ to the input of integrator amplifier 31. High-gain amplifier 32 is driven to full saturation ($\pm V_{sat}$) at the positive and negative peaks ($\pm V_z$) of the input triangular wave as illustrated in FIG. 2.

Figure 1:
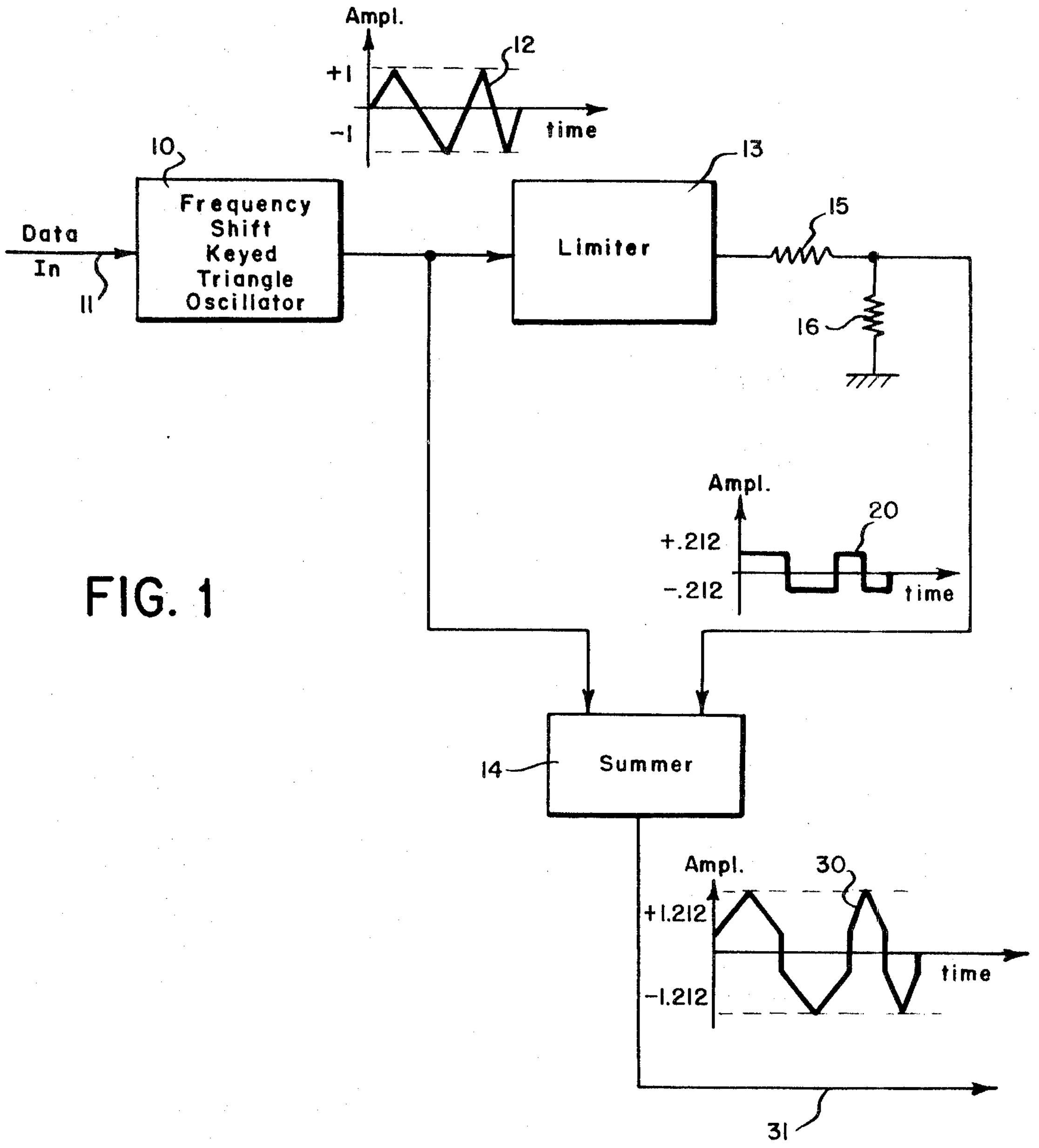
FIG. 1 is a simplified block diagram of the oscillator provided by the invention.

The saturated rectangular signal output from 32 is supplied as a switching signal through resistor 50 to the base of PNP-switch transistor 51. The modulating input signal $e_{in}$ is supplied through balanced input resistors 55 and 56 to the negative and positive inputs of amplifier 30. The respective gains of the negative and positive sections of amplifier 30 are maintained at −1 and +2 respectively by feedback resistor 60. Transistor 51 is switched off by the positive going excursion $+V_{sat}$and switched on by the negative going excursion $-V_{sat}$ so that the gain of the negative channel of amplifier 30 is −1 and the gain of the positive channel is plus one.

Figure 2:
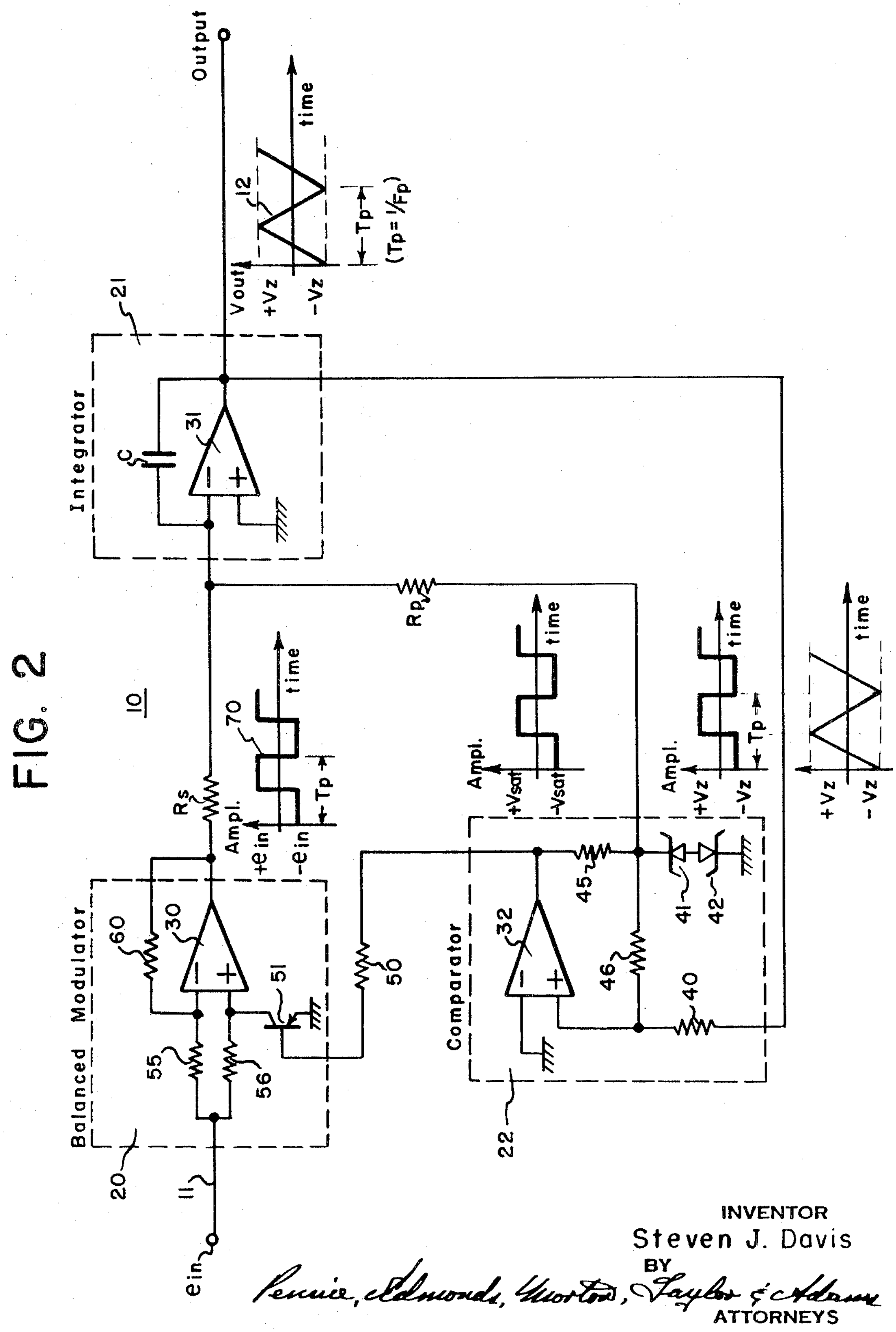
FIG. 2 is a block diagram showing a preferred frequency-shift keyed triangular wave generator for use in the oscillator of FIG. 1.

Modulator 20 thus functions as a balanced modulator by generating a rectangular current wave 70 supplied through $R_s$ that either adds to or subtracts from the rectangular current wave supplied from 22 through $R_p$ accordingly frequency shift of the output wave 12 is linearly dependent on the input voltage $e_{in}$ and the frequency $F_p$ may be determined by the following equation:

$$E_p = 1/4\ R_pC + 1\ /4R_sC \cdot e_{in} 1 V_Z$$

where $V_Z$ is the zener voltage across the zener diodes 41, 42 and $R_P$, $R_s$ and $C$ are the component charging resistors and the integrator capacitor as identified in FIG. 2. Tests made with the above-described oscillator show that a frequency stability of ±0.1 percent may be obtained over a temperature range of 0° to 60° C. using a regulated power supply.

While a preferred embodiment of the present invention has been described, it will be appreciated by those skilled in the art that various modifications may be made without departing from the invention as defined in the claims.

I claim:

1. An electrical oscillator including the combination of
   a. an oscillator for generating a substantially symmetrical triangular wave output signal;
   b. a signal limiter having an input for receiving said triangular wave signal and an output for delivering a limited rectangular wave; and
   c. circuit means for additively combining said triangular wave with said limited rectangular wave to produce a composite oscillator output signal.

2. Apparatus in accordance with claim 1 wherein the peak-to-peak amplitude of said square wave is on the order of 0.2 the peak-to-peak amplitude of said triangular wave.

3. Apparatus in accordance with claim 1 wherein means are included for modulating the frequency of the triangular wave oscillator.

4. A frequency shift modulated oscillator, the combination of
   a. an electrical integrator having an input for receiving a rectangular input signal and an output for delivering a substantially symmetrical triangular wave signal;
   b. comparator means having an input for receiving said triangular wave signal and an output for delivering a saturated rectangular wave signal;
   c. first circuit means for supplying a fixed amplitude portion of said rectangular wave to the input of said integrator; and
   d. second circuit means for supplying a variable amplitude portion of said rectangular wave to the input of said integrator.

5. Apparatus in accordance with claim 4 wherein a balanced modulator responsive to an input data signal is provided to linearly vary the amplitude of the rectangular wave supplied to the integrator by said second circuit means.

6. An electrical oscillator including the combination of
   a. an oscillator for generating a substantially symmetrical triangular wave output signal;
   b. circuit means for generating the rectangular wave signal having the same frequency and phase as said triangular wave signal; and
   c. circuit means for additively combining said triangular wave signal and said rectangular wave signal to produce a composite output signal.

* * * * *

PO-1050
(5/69)

UNITED STATES PATENT OFFICE
CERTIFICATE OF CORRECTION

Patent No. 3,621, 470 Dated November 16, 1971

Inventor(s) Steven J. Davis

It is certified that error appears in the above-identified patent and that said Letters Patent are hereby corrected as shown below:

Column 1, line 1, delete "invention" second occurrence

Column 2, line 11, after "accordingly" insert -- as $e_{in}$ goes positive or negative, in value. The --

Column 2, line 15, "$E_p = 1/4\ R_p\ C + 1/4\ R_s\ C \cdot e_{in}$ $1V_z$" should read -- $F_p = 1/4\ R_pC + 1/4\ R_sC \cdot e_{in}/V_z$ --

Signed and sealed this 20th day of June 1972.

(SEAL)
Attest:

EDWARD M.FLETCHER,JR.
Attesting Officer

ROBERT GOTTSCHALK
Commissioner of Patents